United States Patent [19]

Kinoshita et al.

[11] Patent Number: 6,068,824
[45] Date of Patent: May 30, 2000

[54] ADSORBENT FOR NITROGEN OXIDES AND METHOD FOR REMOVAL OF NITROGEN OXIDES BY USE THEREOF

[75] Inventors: Futoru Kinoshita; Shinyuki Masaki; Hisao Kondo; Motonobu Kobayashi, all of Hyogo, Japan

[73] Assignee: Nippon Shokubai Co., Ltd., Japan

[21] Appl. No.: 08/738,422

[22] Filed: Oct. 25, 1996

Related U.S. Application Data

[63] Continuation of application No. 08/392,378, Feb. 22, 1995, abandoned, which is a continuation-in-part of application No. 08/190,918, Feb. 3, 1994, abandoned.

[30] Foreign Application Priority Data

| Feb. 4, 1993 | [JP] | Japan | 5-17356 |
| Jun. 11, 1993 | [JP] | Japan | 5-140702 |
| Jul. 2, 1993 | [JP] | Japan | 5-164582 |
| Jul. 22, 1993 | [JP] | Japan | 5-181464 |

[51] Int. Cl.$^7$ .................................................. B01D 59/26
[52] U.S. Cl. ........................................ 423/239.1; 95/129
[58] Field of Search .............................. 423/213.2, 213.5, 423/239.1, 213.7; 95/129

[56] References Cited

U.S. PATENT DOCUMENTS

| 3,795,730 | 3/1974 | Kalvinakas . | |
| 5,585,082 | 12/1996 | Ziebarth et al. | 423/244.07 |
| 5,612,276 | 3/1997 | Onitsuka et al. | 502/415 |
| 5,650,127 | 7/1997 | Campbell et al. | 423/239.1 |

FOREIGN PATENT DOCUMENTS

| 3805734 | 3/1990 | Germany . |
| 55-67316 | 5/1980 | Japan . |

OTHER PUBLICATIONS

Patent Abstracts of Japan, Jun. 30, 1992, vol. 16, No. 295.

*Primary Examiner*—Tom Dunn
*Attorney, Agent, or Firm*—Omri M. Behr, Esq.

[57] ABSTRACT

This invention discloses an adsorbent ideal or the removal of nitrogen oxides ($NO_x$: nitrogen monoxide and nitrogen dioxide), particularly nitrogen dioxide, from an exhaust gas containing the nitrogen oxides at low concentrations and a method for efficient removal of nitrogen oxides, particularly nitrogen dioxide, from an exhaust gas containing the nitrogen oxides at low concentrations by the use of the adsorbent. The adsorbent either comprises at least one noble metal selected from the group consisting of Pt, Au, Ru, Rh, and Pd and/or a compound thereof supported on a carrier or comprises the noble metal component and an oxide of at least one heavy metal selected from the group consisting of Mn, Fe, Co, Ni, Cu, Zn and Pb, which may be supported on the carrier, if necessary.

14 Claims, No Drawings

ADSORBENT FOR NITROGEN OXIDES AND METHOD FOR REMOVAL OF NITROGEN OXIDES BY USE THEREOF

This application is a continuation of application Ser. No. 08/392,378, filed Feb. 22, 1995, now abandoned, which is a continuation of Ser. No. 08/190,918 filed Feb. 3, 1994, now abandoned.

DETAILED DESCRIPTION OF THE INVENTION

1. Field of the Invention

This invention relates to an adsorbent for nitrogen oxides and a method for the removal of nitrogen oxides by the use of the adsorbent. More particularly, it relates to an adsorbent ideal for the removal of nitrogen oxides ($NO_x$: nitrogen monoxide and nitrogen dioxide), particularly nitrogen dioxide, contained at low concentrations in an exhaust gas and a method for efficient adsorptive removal of nitrogen oxides, particularly nitrogen dioxide, contained at low concentrations in the exhaust gas by the use of the adsorbent.

2. Description of the Prior Art

Concerning the removal of nitrogen oxides emanating from such a stationary nitrogen oxide generating source as a boiler, the contact reduction method which selectively reduces nitrogen oxides with ammonia as a reducing agent and converts them into harmless nitrogen and water has been finding growing recognition as the most economic measure to date.

Incidentally, the gases discharged from ventilators used in road tunnels, sheltered roads, large-depth underground spaces, and road intersections or the ambient airs surrounding these sites, and the gases discharged from household combustion utensils contain nitrogen oxides at approximate concentrations of 5 ppm, a level extremely low as compared with the average concentration of nitrogen oxides contained in the exhaust gas from boilers. These gases generally occur at a prevalent atmospheric temperature in huge volumes. In order for the contact reduction method mentioned above to attain efficient removal of nitrogen oxides from the gas which is discharged from the ventilation system used in a road tunnel, for example, the temperature of this gas must be elevated to a level exceeding 300° C. at a cost of large energy. The use of the contact reduction method in its unaltered form for the treatment of the gas under discussion, therefore, has a problem of poor economy.

In the circumstances, the desirability of accomplishing efficient removal of nitrogen oxides from such gases as the gas discharged from the ventilation system operating in a road tunnel which contain nitrogen oxides at such a low concentration as not more than about 5 ppm (hereinafter the gas from ventilation or the ambient air surrounding the site of ventilation containing nitrogen oxides at the low concentration just mentioned will be collectively referred to hereinafter as "exhaust gas") has been finding growing approval.

As an agent for adsorptive removal of low-concentration nitrogen oxides, the adsorbent having copper chloride carried on zeolite has been disclosed in JP-A-1-299,642. It has been experimentally ascertained to the present inventors that this adsorbent is highly susceptible of the influence of moisture in the exhaust gas and suffers the ability thereof to adsorb nitrogen oxides to be seriously degraded when the exhaust gas has high humidity.

Further, when the gas discharged from the ventilation system operating in a tunnel is to be treated, since the treatment must be carried out inside the tunnel, the floor space available for the installation of an apparatus to be used for the treatment is limited and the apparatus itself is required to be compact. For the solution of the problems mentioned above, the desirability of developing an adsorbent having an excellent capacity for the treatment of nitrogen oxides has been finding enthusiastic recognition.

An object of this invention is to provide an adsorbent which excels in ability to adsorb nitrogen oxides contained in low concentrations in an exhaust gas.

Another object of this invention is to provide an adsorbent which excels in ability to adsorb nitrogen oxides, particularly nitrogen dioxide, contained in an exhaust gas without being affected by the temperature of the exhaust gas.

Still another object of this invention is to provide a method for efficient adsorptive removal of nitrogen oxides, particularly nitrogen dioxide, in an exhaust gas by the use of an adsorbent.

SUMMARY OF THE INVENTION

The first aspect of this invention resides in an adsorbent for nitrogen oxides characterized by having deposited on a carrier an active component formed of at least one noble metal selected from platinum, gold, ruthenium, rhodium, and palladium and/or a compound thereof.

The second aspect of this invention resides in an adsorbent for nitrogen oxides characterized by comprising at least one noble metal selected from the group consisting of platinum, gold, ruthenium, rhodium, and palladium and/or a compound thereof and the oxide of at least one heavy metal selected from the group consisting of manganese, iron, cobalt, nickel, copper, zinc, and lead.

The third aspect of this invention resides in an adsorbent for nitrogen oxides characterized by having deposited on a carrier at least one noble metal selected from the group consisting of platinum, gold, ruthenium, rhodium, and palladium and/or a compound thereof and an oxide of at least one heavy metal selected from the group consisting of manganese, iron, cobalt, nickel, copper, zinc and copper.

The fourth aspect of this invention resides in a method for the removal of nitrogen oxides from an exhaust gas characterized by advancing the exhaust gas into contact with an adsorbent having deposited on a carrier at least one noble metal selected from the group consisting of platinum, gold, ruthenium, rhodium, and palladium and/or a compound thereof thereby causing the adsorbent to adsorb the nitrogen oxides contained in the exhaust gas.

The fifth aspect of this invention resides in a method for the removal of nitrogen oxides from an exhaust gas characterized by advancing the exhaust gas into contact with an adsorbent comprising at least one noble metal selected from the group consisting of platinum, gold, ruthenium, rhodium, and palladium and/or a compound thereof and an oxide of at least one heavy metal selected from the group consisting of manganese, iron, cobalt, nickel, and copper, zinc and lead thereby causing the adsorbent to adsorb the nitrogen oxides contained in the exhaust gas.

The sixth aspect of this invention resides in a method for the removal of nitrogen oxides from an exhaust gas characterized by advancing the exhaust gas into contact with an adsorbent having deposited on a carrier at least one noble metal selected from the group consisting of platinum, gold, ruthenium, rhodium, and palladium and/or a compound thereof and an oxide of at least one heavy metal selected from the group consisting of manganese, iron, cobalt, nickel, copper, zinc and lead thereby causing the adsorbent to adsorb the nitrogen oxides contained in the exhaust gas.

The adsorbent of this invention, as described above, either comprises at least one noble metal selected from the group consisting of Pt, Au, Ru, RH, and Pd and/or a compound thereof and a carrier or comprises the noble metal component, and an oxide of at least one heavy metal selected from the group consisting of Mn, Fe, Co, Ni, Cu, Zn, and Pb, if necessary these are supported on a carrier. It manifests an excellent effect in removing nitrogen oxides ($NO_x$: nitrogen monoxide and nitrogen dioxide), particularly nitrogen dioxide, from an exhaust gas containing the nitrogen oxides at low concentrations.

EXPLANATION OF THE PREFERRED EMBODIMENT

The noble metal to be used in this invention is at least one member selected from the group consisting of platinum, gold, ruthenium, rhodium, and palladium. Among other noble metals cited above, ruthenium proves particularly preferable. The noble metal is deposited in the form of a simple metal and/or a compound on a carrier. The noble metal and/or the oxide thereof is deposited on the carrier in an amount in the range of 0.01 to 10% by weight, preferably 0.01 to 5% by weight, and more preferably 0.01 to 1% by weight, based on the amount of the carrier. If this amount is less than 0.01% by weight, the disadvantage arises that the capacity of the adsorbent for adsorbing nitrogen oxides is unduly low. Conversely, if the amount exceeds 10% by weight, the disadvantage ensues that the cost of raw materials for the adsorbent is unduly high and the capacity of the adsorbent for adsorbing nitrogen oxides is unduly low.

The carrier to be used in this invention does not need to be particularly limited but may be any of the conventional carriers which have been in popular use to date. At least one member selected from the group consisting of simple oxides such as alumina, silica, titania, and zirconia and complex oxides such as alumina-silica, titania-silica, and titania-zirconia, at least one member selected from the group consisting of naturally occurring oxides such as zeolite, diatomaceous earth, soda lime, and activated carbon, or at least one member selected from the group consisting of synthetic oxides, preferably at least one member selected from the group consisting of simple oxides such as slica and zirconia and complex oxides such as alumina-silica, titania-silica and titania-zirconia can be used. In all of these oxides, at least one complex oxide of large surface area and amorphous texture selected from the group consisting of alumina-silica, titania-silica, and titania-zirconia, especially titania-silica is used more preferably than any of the simple oxides. The surface area of the carrier is in the range of 10 to 400 $m^2/g$.

The physical properties of the adsorbent of this invention are properly selected to suit the conditions under which the adsorbent is used. The specific surface area of the adsorbent is preferable to be in the range of 10 to 400 $m^2/g$ and the pore volume in the range of 0.2 to 0.6 cc/g.

The oxides mentioned above include those which are prepared specially prior to use besides those which are already marketed widely as reagents. Now, typical examples of the procedure to be adopted for the preparation of those complex oxides which are rarely marketed widely as reagents will be cited below. In the case of the complex oxide of titanium-silicon, for example, the titanium source can be properly selected from among such inorganic titanium compounds as titanium chloride and titanium sulfate and such organic titanium compounds as tetraisopropyl titanate and the silicon source from among such inorganic silicon compounds as colloidal silica, water glass, silicon tetrachloride, and finely divided silicic acid and such organic silicon compounds as tetraethyl silicate. Some of these raw materials possibly contain impurities or extraneous substances in very minute amounts. So long as the amounts of such foreign substances are within certain levels, these raw materials may be safely used because the foreign substances in such amounts do not appreciably affect the physical properties of the complex oxide of titanium-silicon. To be more specific, the preparation can be accomplished by the following procedures.

(1) The complex oxide aimed at can be obtained by mixing titanium sulfate with silica sol, adding ammonia to the resultant mixture thereby inducing precipitation, separating the precipitate, washing and drying the separated precipitate, and calcining the cleaned precipitate at a temperature in the range of 300° to 650° C.

(2) The complex oxide aimed at can be obtained by adding an aqueous sodium silicate solution to titanium tetrachloride thereby inducing reaction and precipitation, separating the produced precipitate, washing and drying the separated precipitate, and then calcining the cleaned precipitate at a temperature in the range of 300° to 650° C.

(3) The complex oxide aimed at can be obtained by adding ethyl silicate, $(C_3H_6O)_4Si$, to a water-alcohol solution of titanium tetrachloride, then hydrolyzing the resultant mixture thereby inducing precipitation, separating the produced precipitate, washing and drying the separated precipitate, and subsequently calcining the cleaned precipitate at a temperature in the range of 300° to 650° C.

(4) The complex oxide aimed at can be obtained by adding ammonia to a water-alcohol solution of titanium oxygen chloride, $TiOCl_3$, and ethyl silicate thereby inducing precipitation, separating the produced precipitate, washing and drying the separated precipitate, and then calcining the cleaned precipitate at a temperature in the range of 300° to 650° C.

Among other procedures cited above, the procedure of (1) prove particularly preferable. To be specific, the complex oxide of titanium-silicon can be obtained by preparing the compounds selected as a titanium source and a silicon source in the form of an acidic aqueous solution or sol containing the compounds each at a concentration in the range of 1 to 100 g/liter (as reduced to oxide), allowing the aqueous solution or sol at a temperature in the range of 10° to 100° C. and at a pH value in the range of 2 to 10 thereby producing a coprecipitate of titanium and silicon, separating the coprecipitate by filtration, washing the separated coprecipitate thoroughly, drying the washed coprecipitate at a temperature in the range of 80° to 140° C. for a period in the range of 10 minutes to three hours, and calcining the dried coprecipitate at a temperature in the range of 400° to 700° C. for a period in the range of one to ten hours. Titania-zirconia, ie. the complex oxide of titanium and zirconium, can be obtained by following the procedure while using zirconia sol or a salt such as zirconium nitrate in the plate of silicon.

Silica-alumina is counted among the complex oxides which are available in the market. The commercially available silica-alumina comes in varying grades including those of a high silica content and those of a low silica content. The silica-alumina to be used can be properly selected to suit the conditions under which it is actually used.

The starting materials for the active component and the carrier of the adsorbent are properly selected from among oxides, hydroxides, ammonium salts, nitrates, sulfates, carbonates, acetates, oxalates, and halides of various metals.

In this invention, the noble metal component manifests its excellent effect to a still greater extent when it is used in combination with the heavy metal component.

The heavy metal component is at least one member selected from the group consisting of manganese, iron, cobalt, nickel, copper, zinc and lead. This heavy metal manifests its excellent effect especially when it is used in combination with ruthenium.

When the noble metal component is used in combination with the heavy metal component, the amount of the noble metal component to be used is in the range of 0.01 to 10% by weight, preferably 0.01 to 5% by weight, and more preferably 0.01 to 1% by weight, based on the total amount of the noble metal component and the heavy metal component. If the amount is less than 0.01% by weight, the disadvantage arises that the capacity of the adsorbent for adsorbing nitrogen oxide is unduly low. Conversely, if this amount exceeds 10% by weight, the disadvantage ensues that the cost of raw materials for the adsorbent is increased without any noticeable improvement in the ability of the adsorbent to absorb nitrogen oxides.

When the noble metal component is used in combination with the heavy metal component, though the resultant composition can be used by itself as an adsorbent without being deposited on a carrier, the composition deposited on a carrier manifests its excellent effect to a greater extent. In this case, the amount of the noble metal component is in the range of 0.01 to 10% by weight, preferably 0.01 to 5% by weight, and more preferably 0.01 to 1% by weight, the amount of the heavy metal component in the range of 1 to 70% by weight, preferably 10 to 70% by weight, and more preferably 10 to 60% by weight, based on the total amount of the noble metal component, the heavy metal component, and carrier.

If the amount of the noble metal component is less than 0.01% by weight, the disadvantage arises that the ability of the adsorbent to adsorb nitrogen oxides is unduly low. Conversely, if this amount exceeds 10% by weight, the disadvantage ensues that the cost of raw materials for the adsorbent is unduly high and the ability of the adsorbent to adsorb nitrogen oxides is not improved any more proportionately to the excess over the 10% by weight. If the amount of the heavy metal component is less than 1% by weight, the disadvantage arises that the effect due to the addition of the first heavy metal component is not amply attained.

The carrier to be used for deposition of the combination of the noble metal component with the heavy metal component is totally the same as the carrier which is used for the noble metal component.

The starting materials for the adsorbent, i.e., the noble metal component, the heavy metal component, and the carrier, are properly selected from among the oxides, hydroxides, ammonium salts, nitrates, sulfates, carbonates, acetates, oxalates, and halides of relevant metals as described above. The salt of the noble metal component usually forms a metal by the preparation of the adsorbent, but it can be partially existed in the form of a salt of the starting raw material in some cases.

For the preparation of the adsorbent of this invention, the various procedures cited below are available. The method to be used for the preparation of the adsorbent contemplated by this invention may be suitably altered depending on the starting materials of the components. The present invention does not discriminate the adsorbent on account of the particular method to be adopted for the preparation thereof.

(1) A method which comprises impregnating the carrier in the form of powder with an aqueous solution containing the metal of the noble metal component, evaporating water from the resultant composition, drying the residue of evaporation, calcining the dried composition at a temperature in the range of 300° to 600° C., and forming the fired composition in a desired shape. A method which comprises preparatorily forming the powder of carrier in a desired shape and impregnating the formed carrier with an aqueous solution containing the noble metal component may be used instead.

(2) A method which comprises adding an aqueous solution containing the metal of the noble metal component to an aqueous solution of the starting material of the carrier, thoroughly mixing the two aqueous solution, then adding an alkaline solution of ammonia, sodium hydroxide, or potassium hydroxide to the resultant mixed aqueous solution thereby giving rise to a coprecipitate, separating the produced coprecipitate, washing and drying the separated coprecipitate, then calcining the cleaned composition at a temperature in the range of 300° to 600° C., and forming the calcined composition in a desired shape.

(3) A method which comprises adding the powder of carrier to an aqueous solution of the metal of the noble metal component, converting them into a slurry by kneading, adding an alkaline solution of ammonia, sodium hydroxide, or potassium hydroxide to the slurry thereby inducing deposition of the heavy metal component on the carrier, washing the resultant composite with water, drying the cleaned composite, calcining the dried composite at a temperature in the range of 300° to 600° C., and then forming the calcined composite in a desired shape.

(4) A method which comprises preparatorily forming the carrier, impregnating the formed carrier with an aqueous solution containing the metal of the noble metal component, drying the wet composition, and then calcining the dry composition at a temperature in the range of 300° to 600° C.

(5) A method which comprises thoroughly mixing an aqueous solution containing the metal of the noble metal component with either powders of oxides, hydroxides, carbonates, or other similar salts of the metals of the heavy metal component or powders of oxides, hydroxides, carbonates, or other similar salts of the metals of the heavy metal component and a powder of the carrier, thoroughly kneading the resultant mixture with a suitable amount of water added thereto, forming the resultant dough in a desired shape, properly drying the formed dough, and calcining the dry composite at a temperature in the range of 300° to 600° C.

(6) A method which comprises impregnating a powder of the carrier with an aqueous solution containing the metals of the noble metal component, the metal component, evaporating water from the resultant mixture, drying the residue of evaporation, calcining the dried composition at a temperature in the range of 300° to 600° C., and then forming the calcined composition in a desired shape.

(7) A method which comprises adding an aqueous solution containing the metals of the noble metal component, the metal component to an aqueous solution of the starting material of the carrier, mixing the two aqueous solutions thoroughly, adding an alkaline solution of ammonia, sodium hydroxide, or potassium hydroxide to the resultant mixture thereby giving rise to a coprecipitate, separating the produced coprecipitate, washing the separated coprecipitate with water, drying the washed coprecipitate, calcining the cleaned composition at a temperature in the range of 300° to 600° C., and then forming the calcined composition in a desired shape.

(8) A method which comprises adding a powder of the carrier to an aqueous solution containing the metals of the noble metal component, the metal component thereby giving rise to a slurry, adding an alkaline solution of ammonia, sodium hydroxide, or potassium hydroxide to the slurry thereby inducing deposition of the noble metal component, the metal component on the carrier, washing the resultant composite with water, drying the cleaned composite, calcining the dried composite at a temperature in the range of 300° to 600° C., and then forming the calcined composite in a desired shape.

For any of the methods cited above, a procedure which comprises preparatorily forming a powder of the carrier, causing the active components mentioned above to be deposited on the formed carrier in the same manner as described above, and then suitably drying and calcining the resultant composite may be adopted.

The shape of the adsorbent is not particularly limited. It may be suitably selected from among the shape of circular columns, cylinders, spheres, plates, saddles, honeycombs, or other similar monolithic particles, depending on the part to be used for packing the adsorbent of this invention and the manner of working the method of adsorption contemplated by this invention. The formation of this adsorbent may be attained by any of the conventional methods such as, for example, the tablet molding method and the extrusion molding method. The average particle diameter of such a particulate adsorbent is in the range of 1 to 10 mm. The adsorbent of the shape of a honeycomb is manufactured by the extrusion molding method or the method of rolling tightly a sheetlike element in much the same way as the monolithic carrier. The opening formed in the adsorbent for passage of gas (form of cell) may be in the shape of a hexagon, a rectangle, a triangle, or a corrugation. The cell density (number of cells/unit cross section) is in the range of 25 to 600 cells/square inch, preferably 25 to 500 cells/square inch.

The adsorbent, so long as it has the percentage composition defined above, is allowed to have such physical properties thereof as strength, shape, specific surface area, and pore volume properly altered, depending on the conditions under which the adsorbent is to be used. Particularly the specific surface area is preferable to be in the range of 10 to 400 $m^2/g$, preferably 10 to 300 $m^2/g$ when the carrier is used and to be in the range of 10 to 100 $m^2/g$ when the carrier is not used, and the pore volume in the range of 0.2 to 0.6 cc/g, preferably 0.2 to 0.5 cc/g.

The method for establishing contact between the adsorbent mentioned above and the exhaust gas for the removal of nitrogen oxides as contemplated by this invention is not particularly limited. This contact is generally attained by introducing the exhaust gas into a bed formed of the adsorbent. Though the conditions to be adopted for the treatment by this contact cannot be generally defined because they are variable with the behavior of the exhaust gas under treatment, the temperature of the exhaust gas supplied to the site of treatment is generally in the range of 0 to 100° C., preferably 0 to 50° C.

The space velocity (SV) of the exhaust gas so supplied is generally in the range of 500 to 50,000 $hr^{-1}$ (STP), preferably 2,000 to 30,000 $hr^{-1}$.

The adsorbent of this invention is particularly effective in the adsorptive removal of nitrogen dioxide among other nitrogen oxides. Thus, the removal of nitrogen oxides from the exhaust gas is attained more effectively by preparatorily treating the exhaust gas with such an oxidizing agent as ozone thereby converting nitrogen monoxide originally present in the into nitrogen dioxide and thereafter advancing the exhaust gas into contact with the adsorbent. When ozone is added into the exhaust gas containing nitrogen monoxide, the nitorogen monoxide is oxidized to nitrogen dioxide for 1 second of contact time. The reaction is equimolar reaction. It is, of course, permissible to advance the exhaust gas in its unmodified form into contact with the adsorbent of this invention and effect adsorptive removal chiefly of nitrogen dioxide in all of the nitrogen oxides inherently entrained by the exhaust gas. Further, the adsorbent in accordance with the present invention can remove the nitrogen oxides in the exhaust gas more effectively by coexistence of excess amount of ozone which oxidize the nitrogen monoxide to nitrogen dioxide.

When the ozone ($O_3$) as an oxidizing agent is preparatorily added to the exhaust gas, the concentration of the added ozone is desired to be in the range of 0.5 to 5 based on the concentration of nitrogen oxides present in the exhaust gas taken as unity. If the concentration of the ozone is less than 0.5, the adsorbent fails to adsorb nitrogen oxides efficiently. If the concentration exceeds 5, the disadvantage arises that the ozone is liable to be washed away the site of treatment.

Further, the adsorbent of this invention brings about an excellent effect of removing by decomposition an excess amount of $O_3$ added to the exhaust gas.

Now, this invention will be described more specifically below with reference to working examples.

EXAMPLE 1

By the use of a kneader, 80 g of an aqueous platinum nitrate solution (a product of Tanaka Kikinzoku K.K. containing 3.75% by weight of Pt as metal) and 997 g of zirconia (produced by Daiichi Kigenso Kagaku Kogyo K.K. and marketed under trademark designation of "Zirconium Oxide EP") were thoroughly mixed, with a suitable amount of water added meanwhile thereto. The mixture was forced through an extrusion molding device to produce pellets 5 mm in diameter and 5 mm in length. The pellets were dried at 100° C. for 10 hours and then calcined in an atmosphere of air at 350° C. for 3 hours.

The adsorbent thus obtained had a composition containing Pt and $ZrO_2$ respectively at concentrations of 0.3% by weight and 99.7% by weight.

EXAMPLES 2 TO 5

Adsorbents were prepared by following the procedure of Example 1 while using an aqueous chloroauric acid solution, an aqueous ruthenium nitrate solution, an aqueous rhodium nitrate solution, and an aqueous palladium nitrate solution respectively in the place of the aqueous platinum nitrate. The adsorbents were forced through an extrusion molding device to produce pellets.

EXAMPLE 6

By the use of a kneader, 80 g of an aqueous platinum nitrate solution (a product of Tanaka Kikinzoku K.K. containing 3.75% by weight of Pt as metal) and 997 g of silica (produced by Mizusawa Kagaku K.K. and marketed under trademark designation of "AMT-Silica") were thoroughly mixed, with a suitable amount of water added meanwhile thereto. The resultant mixture was forced through an extrusion molding device to obtain pellets 5 mm in diameter and 5 mm in length. The pellets were dried at 100° C. for 10 hours and calcined in an atmosphere of air at 350° C. for 3 hours.

The adsorbent thus obtained had a composition containing Pt and Si respectively at 0.3% by weight and 99.7% by weight.

EXAMPLES 7 TO 10

Adsorbents were prepared by following the procedure of Example 6 while using an aqueous chloroauric acid solution, an aqueous ruthenium nitrate solution, an aqueous rhodium nitrate solution, and an aqueous palladium nitrate solution respectively in the place of the aqueous platinum nitrate solution. The adsorbents were forced through an extrusion molding device to produce pellets.

EXAMPLE 11

A composite oxide of titanium-silicon ($TiO_2$—$SiO_2$, hereinafter occasionally referred to briefly as "TS") was prepared by the following method. First, as a titanium source, an aqueous sulfuric acid solution of titanyl sulfate having a composition of 250 g of $TiOSO_4$ as reduced to $TiO_2$ per liter and 1,100 g of total $H_2SO_4$ per liter was prepared. Then, a solution was prepared by adding 71.5 liters of aqua ammonia (25% $NH_3$) to 100 liters of water and adding 6 kg of an aqueous 30 wt % silica sol solution to the resultant aqueous ammonia solution.

This solution was kept stirred and an aqueous titanium-containing sulfuric acid solution obtained by diluting 38.2 liters of the aqueous sulfuric acid solution of titanyl sulfate was gradually added dropwise to the stirred solution to give rise to a coprecipitated gel. The resultant reaction mixture was left standing for 15 hours and then left standing at rest.

The $TiO_2$—$SiO_2$ gel thus obtained was separated by filtration, washed with water, dried, and then calcined in the open air at 400° C. for 6 hours. As a result, the complex oxide, $TiO_2$—$SiO_2$ was obtained.

By the use of a kneader, 497 g of the complex oxide $TiO_2$—$SiO_2$ in a powdered form and 80 g of an aqueous platinum nitrate solution (a product of Tanaka Kikinzoku K.K. containing 3.75% by weight of Pt as metal) were thoroughly mixed, with a suitable amount of water added meanwhile thereto. The resultant mixture was forced through an extrusion molding device to obtain pellets 5 mm in diameter and 5 mm in length. The pellets were dried at 100° C. for 10 hours and then calcined in an atmosphere of air at 350° C. for 3 hours.

The adsorbent thus obtained had a composition containing Pt and TS respectively at 0.3% by weight and 99.7% by weight.

EXAMPLES 12 TO 15

Adsorbents were prepared by following the procedure of Example 11 while using an aqueous chloroauric acid solution, an aqueous ruthenium nitrate solution, an aqueous rhodium nitrate solution, and an aqueous palladium nitrate solution respectively in the place of the aqueous platinum nitrate. The adsorbents were forced through an extrusion molding device to produce pellets.

EXAMPLE 16

By the use of a kneader, 80 g of an aqueous platinum nitrate solution (a product of Tanaka Kikinzoku K.K. containing 3.75% by weight of Pt as metal) and 997 g of alumina silica powder (produced by Shokubai Kasei Kogyo K.K. and marketed under trademark designation of "Alumina-Silica LA," hereinafter referred to occasionally as "AS") were thoroughly mixed, with a suitable amount of water added meanwhile thereto. The resultant mixture was forced through an extrusion molding device to obtain pellets 5 mm in diameter and 5 mm in length. The pellets were dried at 100° C. for 10 hours and then fired in an atmosphere of air at 350° C. for 3 hours.

The adsorbent thus obtained had a composition containing Pt and AS respectively at concentrations of 0.3% by weight and 99.7% by weight.

EXAMPLES 17 TO 20

Adsorbents were prepared by following the procedure of Example 16 while using an aqueous chloroauric acid solution, an aqueous ruthenium nitrate solution, an aqueous rhodium nitrate solution, and an aqueous palladium nitrate solution respectively in the place of the aqueous platinum nitrate solution. The adsorbents were forced through an extrusion molding device to produce pellets.

EXAMPLE 21

Titania-zirconia (hereinafter referred to T-Z) was prepared by a similar procedure of Example 11, except that zirconia sol is used in the place of silica sol which is a raw material of titania-silica.

By the use of a kneader, 80 g of an aqueous platinum nitrate solution (a product of Tanaka Kikinzoku K.K. containing 3.75% by weight of Pt as metal) and 997 g of the TZ were thoroughly mixed, with a suitable amount of water added meanwhile thereto. The resultant mixture was forced through an extrusion molding device to obtain pellets 5 mm in diameter and 5 mm in length. The pellets were dried at 100° C. for 10 hours and then fired in an atmosphere of air at 350° C. for 3 hours.

The adsorbent thus obtained had a composition containing Pt and TZ respectively at concentrations of 0.3% by weight and 99.7% by weight.

EXAMPLES 22 TO 25

Adsorbents were prepared by following the procedure of Example 21 while using an aqueous chloroauric acid solution, an aqueous ruthenium nitrate solution, an aqueous rhodium nitrate solution, and an aqueous palladium nitrate solution respectively in the place of the aqueous platinonitric acid. The adsorbents were forced through an extrusion molding device to produce pellets.

Control 1

A Y type zeolite (produced by Toso K.K., marketed under trademark designation of "Zeolite," and having a $SiO_2/Al_2O_3$ ratio of 5.5) was stirred in an aqueous solution containing cupric chloride ($CuCl_2$) at a concentration of 1 mol/liter at normal room temperature for 20 hours to be impregnated with the solution. The resultant composite was washed with water, separated by filtration, dried at 110° C. for 2 hours, and then calcined at 400° C. for 3 hours.

By the use of a kneader, the resultant powder and a suitable amount of water added thereto were thoroughly mixed. The mixture consequently obtained was forced through an extrusion molding device to obtain pellets 5 mm in diameter and 5 mm in length. The pellets were dried at 100° C. for 10 hours and calcined in an atmosphere of air at 350° C. for 3 hours.

The resultant adsorbent had a composition containing Cu and Y type zeolite respectively at concentrations of 7.5% by weight and 92.5% by weight.

In the adsorbents obtained in the examples and the control cited above, the weight ratios of active component to carrier were as shown in Table 1.

EXAMPLE 26

The adsorbents obtained in Examples 1, 25 and control 1 were tested for ability to adsorb nitrogen oxides ($NO_x$ removal ratio) by the following method.

The glass reaction tube 30 mm in inside diameter was packed with 228 ml of a given adsorbent and a synthetic gas of the following composition was introduced into the bed of absorbent in the reaction tube under the following conditions.

Synthetic Gas Composition

Nitrogen monoxide (NO): 3 ppm, $H_2O$: 2.5% by volume, and air: balance.

Conditions for Treatment

Flow volume of gas: 15.2 NL/min, treating temperature: 25° C., space velocity (SV): 4,000 $hr^{-1}$ (STP), gas humidity: 85% RH.

The $NO_x$ removal ratio was determined by sampling the synthetic gas at the inlet and outlet of the bed of adsorbent after the elapse of 1 hour following the start of introduction of the synthetic gas, analyzing the samples for nitrogen oxides ($NO_x$) concentration by the use of a chemical emission type $NO_x$ meter, and calculating the following formula using the results of test. The results are shown in Table 2.

$NO_x$ removal ratio (%)=[($NO_x$ concentration at inlet–$NO_x$ concentration at outlet)/($NO_x$ concentration at inlet)]×100

EXAMPLE 27

The adsorbents obtained in Examples 1 to 25 and Control 1 were tested for ability to adsorb nitrogen oxides ($NO_x$ removal ratio) by the following method, except that the gas composition was varried as follows:

Synthetic Gas Composition

Nitrogen monoxide (NO): 3 ppm, $H_2O$: 2.5% by volume, ozone ($O_3$); 3 ppm, air: balance.

Wherein nitrogen monoxide (NO) was completely converted to nitrogen dioxide ($NO_2$).

The $NO_x$ removal ratio was determined by sampling the synthetic gas at the inlet and outlet of the bed of adsorbent after the elapse of 10 hours and 20 hours following the start of introduction of the synthetic gas, analyzing the samples for nitrogen oxides ($NO_x$) concentration by the use of a chemical emission type $NO_x$ meter, and calculating the above-mentioned formula using the results of test. The results are shown in Table 2.

EXAMPLE 28

The adsorbents obtained in Examples 1 to 25 and Control 1 were tested for ability to adsorb nitrogen oxides ($NO_x$ removal ratio) by the following method, except that the gas composition was varried as follows:

Synthetic Gas Composition

Nitrogen monoxide (NO): 3 ppm, $H_2O$: 2.5% by volume, ozone ($O_3$); 4.5 ppm, air: balance.

Wherein nitrogen monoxide (NO) was completely converted to nitrogen dioxide ($NO_2$) and excess of ozone ($O_3$) was coexisted in 1.5 ppm.

The $NO_x$ removal ratio was determined by sampling the synthetic gas at the inlet and outlet of the bed of adsorbent after the elapse of 10 hours and 20 hours following the start of introduction of the synthetic gas, analyzing the samples for nitrogen oxides ($NO_x$) concentration by the use of a chemical emission type $NO_x$ meter, and calculating the above-mentioned formula using the results of test. The results are shown in Table 2.

TABLE 1

| Adsorbent | Composition of adsorvent | Weght ratio (%) | Specific surface ($m^2/g$) |
| --- | --- | --- | --- |
| Example 1 | Pt, $ZrO_2$ | 0.3, 99.7 | 78 |
| Example 2 | Au, $ZrO_2$ | 0.3, 99.7 | 79 |
| Example 3 | Ru, $ZrO_2$ | 0.3, 99.7 | 78 |
| Example 4 | Rh, $ZrO_2$ | 0.3, 99.7 | 77 |
| Example 5 | Pd, $ZrO_2$ | 0.3, 99.7 | 79 |
| Example 6 | Pt, $SiO_2$ | 0.3, 99.7 | 318 |
| Example 7 | Au, $SiO_2$ | 0.3, 99.7 | 320 |
| Example 8 | Ru, $SiO_2$ | 0.3, 99.7 | 317 |
| Example 9 | Rh, $SiO_2$ | 0.3, 99.7 | 310 |
| Example 10 | Pd, $SiO_2$ | 0.3, 99.7 | 321 |
| Example 11 | Pt, TS | 0.3, 99.7 | 148 |
| Example 12 | Au, TS | 0.3, 99.7 | 147 |
| Example 13 | Ru, TS | 0.3, 99.7 | 146 |
| Example 14 | Rh, TS | 0.3, 99.7 | 148 |
| Example 15 | Pd, TS | 0.3, 99.7 | 149 |
| Example 16 | Pt, AS | 0.3, 99.7 | 242 |
| Example 17 | Au, AS | 0.3, 99.7 | 241 |
| Example 18 | Ru, AS | 0.3, 99.7 | 245 |
| Example 19 | Rh, AS | 0.3, 99.7 | 240 |
| Example 20 | Pd, AS | 0.3, 99.7 | 235 |
| Example 21 | Pt, TZ | 0.3, 99.7 | 60 |
| Example 22 | Au, TZ | 0.3, 99.7 | 59 |
| Example 23 | Ru, TZ | 0.3, 99.7 | 57 |
| Example 24 | Rh, TZ | 0.3, 99.7 | 58 |
| Example 25 | Pd, TZ | 0.3, 99.7 | 60 |
| Control 1 | Cu, Zeolite | 7.5, 92.5 | |

TABLE 2

| | | $NO_x$ removal ratio (%) | | | |
| --- | --- | --- | --- | --- | --- |
| | | Example 27 | | Example 28 | |
| Adsorbent | Example 26 1 hr | After 10 hrs | After 20 hrs | After 10 hrs | After 20 hrs |
| Example 1 | 73 | 75 | 55 | 82 | 74 |
| Example 2 | 67 | 69 | 50 | 77 | 68 |
| Example 3 | 84 | 85 | 71 | 91 | 87 |
| Example 4 | 80 | 82 | 65 | 88 | 83 |
| Example 5 | 73 | 75 | 56 | 82 | 75 |
| Example 6 | 69 | 71 | 52 | 79 | 71 |
| Example 7 | 64 | 66 | 46 | 74 | 64 |
| Example 8 | 83 | 84 | 68 | 90 | 85 |
| Example 9 | 79 | 80 | 63 | 87 | 81 |
| Example 10 | 71 | 72 | 51 | 80 | 70 |
| Example 11 | 73 | 75 | 55 | 82 | 74 |
| Example 12 | 68 | 70 | 50 | 78 | 68 |
| Example 13 | 84 | 85 | 71 | 91 | 87 |
| Example 14 | 81 | 83 | 67 | 89 | 84 |
| Example 15 | 73 | 75 | 56 | 82 | 75 |
| Example 16 | 71 | 72 | 52 | 80 | 71 |
| Example 17 | 64 | 66 | 46 | 74 | 64 |
| Example 18 | 83 | 84 | 69 | 90 | 86 |
| Example 19 | 79 | 80 | 64 | 87 | 82 |
| Example 20 | 69 | 71 | 52 | 79 | 71 |
| Example 21 | 73 | 75 | 55 | 82 | 74 |
| Example 22 | 67 | 69 | 50 | 77 | 68 |
| Example 23 | 84 | 85 | 71 | 91 | 87 |
| Example 24 | 81 | 83 | 67 | 89 | 84 |
| Example 25 | 73 | 75 | 55 | 82 | 74 |
| Control 1 | 12 | 12 | 6 | 15 | 10 |

EXAMPLE 29

By the use of a kneader, 80 g of an aqueous platinum nitrate solution (a product of Tanaka Kikinzoku K.K. containing 3.75% by weight of Pt as metal) and 1,318.2 g of manganese carbonate were thoroughly mixed, with a suitable amount of water added meanwhile thereto. The resultant mixture was forced through an extrusion molding device to obtain pellets 5 mm in diameter and 5 mm in length. The pellets were dried at 100° C. for 10 hours and then calcined in an atmosphere of air at 350° C. for 3 hours.

The adsorbent thus obtained had a composition containing Pt and $MnO_2$ respectively at concentrations of 0.3% by weight and 99.7% by weight.

EXAMPLES 30 TO 63

Adsorbent pellets indicated in Table 3 were obtained by following the procedure of Example 29 while using iron hydroxide, basic cobalt carbonate, basic nickel carbonate, basic copper carbonate, basic zinc carbonate or basic lead carbonate in the place of manganese carbonate and further using an aqueous chloroauric acid solution, an aqueous ruthenium nitrate solution, an aqueous rhodium nitrate solution, and an aqueous palladium nitrate solution in the place of the aqueous platinum nitrate solution.

EXAMPLE 64

A complex oxide of titanium-silicon ($TiO_2$—$SiO_2$, hereinafter occasionally referred to briefly as "TS") was prepared by the following method. First, as a titanium source, an aqueous nitric acid solution of titanyl sulfate having a composition of 250 g of $TiOSO_4$ as reduced to $TiO_2$ per liter and 1,100 g of whole $H_2SO_4$ per liter was prepared. Then, a solution was prepared by adding 71.5 liters of aqua ammonia (25% $NH_3$) to 100 liters of water and then adding 6 kg of an aqueous 30 wt % silica sol solution to the resultant aqueous solution.

This solution was kept stirred and an aqueous titanium-containing sulfuric acid solution obtained by diluting 38.2 liters of the aqueous sulfuric acid solution of titanyl sulfate in 75 liters of water was gradually added dropwise to the stirred solution to give rise to a coprecipitated gel. The resultant reaction mixture was left standing for 15 hours and then left standing at rest.

By the use of a kneader, 497 g of the complex oxide of $TiO_2$—$SiO_2$ thus obtained in the form of powder and 80 g of an aqueous platinonitric acid solution (a product of Tanaka Kikinzoku K.K. containing 3.75% by weight of Pt as metal) and 661.1 g of manganese carbonate (reagent chemical) were thoroughly mixed, with a suitable amount of water added meanwhile thereto. The resultant mixture was forced through an extrusion molding device to obtain pellets 5 mm in diameter and 5 mm in length. These pellets were dried at 100° C. for 10 hours and then calcined in an atmosphere of air at 350° C. for 3 hours.

The adsorbent thus obtained had a composition containing Pt, $MnO_2$, and TS respectively at concentrations of 0.3% by weight, 50% by weight, and 49.7% by weight.

EXAMPLES 65 TO 98

Adsorbent pellets were obtained by following the procedure of Example 64 while using an aqueous chloroauric acid solution, an aqueous ruthenium nitrate solution, an aqueous rhodium nitrate solution, and an aqueous palladium nitrate solution in the place of the aqueous platinum nitrate solution and further using iron hydroxide, basic cobalt carbonate, basic nickel carbonate, basic copper carbonate, basic zinc carbonate or basic lead carbonate in the place of manganese carbonate. The compositions of these adsorbent pellets are shown in Table 4.

EXAMPLE 99

By the use of a kneader, 71.4 g of an aqueous ruthenium nitrate solution (a product of Tanaka Kikinzoku K.K. containing 4.20% by weight of Ru as metal) and 661.1 g of manganese carbonate (reagent chemical grade $MnCO_3$) and 497 g of alumina powder (produced by Sumitomo Chemical Industry Co., Ltd. and marketed under trademark designation of "A-11 $\gamma Al_2O_3$") were thoroughly mixed, with a suitable amount of water added meanwhile thereto. The resultant mixture was forced through an extrusion molding device to obtain pellets 5 mm in diameter and 5 mm in length. The pellets were dried at 100° C. for 10 hours and then calcined in an atmosphere of air at 350° C. for 3 hours.

The adsorbent thus obtained had a composition containing Ru, $MnO_2$, and $Al_2O_3$ respectively at concentrations of 0.3% by weight, 50% by weight, 49.7% by weight, and 59.7% by weight.

EXAMPLES 100 TO 103

Adsorbent pellets were obtained by following the procedure of Example 99 while using titania powder (produced by Rhône-Poulenc and marketed under trademark designation of "Anatase type Titanium dioxide DT-50"), zirconia powder (produced by Daiichi Kigenso Kagaku Kogyo K.K. and marketed under trademart designation of "Zirconium EP"), titania-zirconia prepared by following the procedure of Example 21 while using zirconia sol in the place of the silica sol prepared in Example 99 as the raw material for titania-zirconia (hereinafter referred to occasionally as TZ), and alumina-silica powder (produced by Shokubai KaseiKogyo K.K. and marketed under trademark designation of "Alumina-Silica LA," hereinafter referred to occasionally as "AS") in the place of the alumina powder. The compositions of these adsorbent pellets are shown in Table 5.

EXAMPLE 104

By the use of a kneader, 597 g of the complex titania-silica oxide prepared in Example 64, 71.4 g of aqueous ruthenium nitrate solution (a product of Tanaku Kikinzokyu K.K. containing 4.20% by weight of Ru as metal), 264.4 g of manganese carbonate (reagent chemical grade $MnCO_3$), and 222.7 g of iron hydroxide (reagent chemical grade FeO(OH)) were thoroughly mixed, with a suitable amount of water added meanwhile thereto. The resultant mixture was forced through an extrusion molding device to obtain pellets 5 mm in diameter and 5 mm in length. These pellets were dried at 100° C. for 10 hours and then calcined in an atmosphere of air at 350° C. for 3 hours.

The adsorbent thus obtained had a composition containing Ru, $MnO_3$, $Fe_2O_3$, and TS respectively at concentrations of 0.3% by weight, 20% by weight, 20% by weight, and 59.7% by weight.

EXAMPLES 105 TO 109

Adsorbent pellets were obtained by following the procedure of Example 104 while using basic cobalt carbonate, basic nickel carbonate, basic copper carbonate, basic zinc carbonate or basic lead carbonate in the place of the iron hydroxide. The compositions of these adsorbent pellets are shown in Table 5.

EXAMPLE 110

By the use of a kneader, 597 g of the complex titania-silica oxide prepared in Example 64, 71.4 g of an aqueous ruthenium nitrate solution (a product of Tanaka Kikinzoku K.K. containing 4.20% by weight of Ru as metal), 333.5 g of basic cobalt carbonate (reagent chemical $Co_5(OH))_6$·$(CO_3)_2$ containing 44% of Co as metal), and 365.5 g of basic nickel carbonate (reagent chemical grade $Ni_5(CO_3)_2 \cdot (OH)_6 \cdot 4H_2O$ containing 43% by weight of Ni as metal) were thoroughly mixed, with a suitable amount of water added meanwhile thereto to obtain pellets 5 mm in diameter and 5 mm in length. These pellets were dried at 100° C. for ten hours and then calcined in an atmosphere of air at 350° C. for three hours. The adsorbent thus obtained had a composition containing Ru, $Co_2O_4$, NiO, and TS respectively at concentrations of 0.3% by weight, 20% by weight, 20% by weight, and 59.7% by weight.

EXAMPLE 111 TO 113

Adsorbent pellets were obtained by following the procedure of Example 110 while using basic copper carbonate, basic zinc carbonate or basic lead carbonate in the place of the basic nickel carbonate. The composition of the adsorbent pellets is shown in Table 5.

EXAMPLE 114

The adsorbents obtained in Examples 29 to 113 were tested for ability to adsorb nitrogen oxides by following the procedure of Example 26 while changing the space velocity to 24,000 $hr^{-1}$. The results are shown in Tables 6 to 8.

EXAMPLE 115

The adsorbents obtained in Examples 29 to 113 were tested for ability to adsorb nitrogen oxides by following the procedure of Example 27 while changing the space velocity to 24,000 $hr^{-1}$. The results are shown in Tables 6 to 8.

EXAMPLE 116

The adsorbents obtained in Examples 29 to 113 were tested for ability to adsorb nitrogen oxides by following the procedure of Example 28 while changing the space velocity to 24,000 $hr^{-1}$. The results are shown in Tables 6 to 8.

TABLE 3

| Adsorbent | Composition of adsorvent | Weight ratio (%) | Specific surface ($m^2/g$) |
|---|---|---|---|
| Example 29 | Pt, $MnO_2$ | 0.3, 99.7 | |
| Example 30 | Pt, Fe2O3 | 0.3, 99.7 | |
| Example 31 | Pt, $Co_3O_4$ | 0.3, 99.7 | |
| Example 32 | Pt, NiO | 0.3, 99.7 | |
| Example 33 | Pt, CuO | 0.3, 99.7 | |
| Example 34 | Pt, ZnO | 0.3, 99.7 | |
| Example 35 | Pt, PbO | 0.3, 99.7 | |
| Example 36 | Au, $MnO_2$ | 0.3, 99.7 | |
| Example 37 | Au, $Fe_2O_3$ | 0.3, 99.7 | |
| Example 38 | Au, $Co_3O_4$ | 0.3, 99.7 | |
| Example 39 | Au, NiO | 0.3, 99.7 | |
| Example 40 | Au, CuO | 0.3, 99.7 | |
| Example 41 | Au, ZnO | 0.3, 99.7 | |
| Example 42 | Au, PbO | 0.3, 99.7 | |
| Example 43 | Ru, $MnO_2$ | 0.3, 99.7 | 70 |
| Example 44 | Ru1 $Fe_2O_3$ | 0.3, 99.7 | 30 |
| Example 45 | Ru, $Co_3O_4$ | 0.3, 99.7 | 72 |
| Example 46 | Ru, NiO | 0.3, 99.7 | 98 |
| Example 47 | Ru, CuO | 0.3, 99.7 | 65 |
| Example 48 | Ru, ZnO | 0.3, 99.7 | 21 |
| Example 49 | Ru, PbO | 0.3, 99.7 | 32 |
| Example 50 | Rh, $MnO_2$ | 0.3, 99.7 | |
| Example 51 | Rh, $Fe_2O_3$ | 0.3, 99.7 | |
| Example 52 | Rh, $Co_3O_4$ | 0.3, 99.7 | |
| Example 53 | Rh, NiO | 0.3, 99.7 | |
| Example 54 | Rh, CuO | 0.3, 99.7 | |
| Example 55 | Rh, ZnO | 0.3, 99.7 | |
| Example 56 | Rh, PbO | 0.3, 99.7 | |
| Example 57 | Pd, $MnO_2$ | 0.3, 99.7 | |

TABLE 3-continued

| Adsorbent | Composition of adsorvent | Weight ratio (%) | Specific surface ($m^2/g$) |
|---|---|---|---|
| Example 58 | Pd, $Fe_2O_3$ | 0.3, 99.7 | |
| Example 59 | Pd, $Co_3O_4$ | 0.3, 99.7 | |
| Example 60 | Pd, NiO | 0.3, 99.7 | |
| Example 61 | Pd, CuO | 0.3, 99.7 | |
| Example 62 | Pd, ZnO | 0.3, 99.7 | |
| Example 63 | Pd, PbO | 0.3, 99.7 | |

TABLE 4

| Adsorbent | Composition of adsorvent | Weight ratio (%) | Specific surface ($m^2/g$) |
|---|---|---|---|
| Example 64 | Pt, $MnO_2$, TS | 0.3, 50, 49.7 | |
| Example 65 | Pt, $Fe_2O_3$, TS | 0.3, 50, 49.7 | |
| Example 66 | Pt, $Co_3O_4$, TS | 0.3, 50, 49.7 | |
| Example 67 | Pt, NiO, TS | 0.3, 50, 49.7 | |
| Example 68 | Pt, CuO, TS | 0.3, 50, 49.7 | |
| Example 69 | Pt, ZnO, TS | 0.3, 50, 49.7 | |
| Example 70 | Pt, PbO, TS | 0.3, 50, 49.7 | |
| Example 71 | Au, $MnO_2$, TS | 0.3, 50, 49.7 | |
| Example 72 | Au, $Fe_2O_3$, TS | 0.3, 50, 49.7 | |
| Example 73 | Au, $Co_3O_4$, TS | 0.3, 50, 49.7 | |
| Example 74 | Au, NiO, TS | 0.3, 50, 49.7 | |
| Example 75 | Au, CuO, TS | 0.3, 50, 49.7 | |
| Example 76 | Au, ZnO, TS | 0.3, 50, 49.7 | |
| Example 77 | Au, PbO, TS | 0.3, 50, 49.7 | |
| Example 78 | Ru, $MnO_2$, TS | 0.3, 50, 49.7 | 109 |
| Example 79 | Ru, $Fe_2O_3$, TS | 0.3, 50, 49.7 | 89 |
| Example 80 | Ru, $Co_3O_4$, TS | 0.3, 50, 49.7 | 110 |
| Example 81 | Ru, NiO, TS | 0.3, 50, 49.7 | 124 |
| Example 82 | Ru, CuO, TS | 0.3, 50, 49.7 | 105 |
| Example 83 | Ru, ZnO, TS | 0.3, 50, 49.7 | 82 |
| Example 84 | Ru, PbO, TS | 0.3, 50, 49.7 | 92 |
| Example 85 | Rh, $MnO_2$, TS | 0.3, 50, 49.7 | |
| Example 86 | Rh, $Fe_2O_3$, TS | 0.3, 50, 49.7 | |
| Example 87 | Rh, $Co_3O_4$, TS | 0.3, 50, 49.7 | |
| Example 88 | Rh, NiO, TS | 0.3, 50, 49.7 | |
| Example 89 | Rh, CuO, TS | 0.3, 50, 49.7 | |
| Example 90 | Rh, ZnO, TS | 0.3, 50, 49.7 | |
| Example 91 | Rh, PbO, TS | 0.3, 50, 49.7 | |
| Example 92 | Pd, $MnO_2$, TS | 0.3, 50, 49.7 | |
| Example 93 | Pd, $Fe_2O_3$, TS | 0.3, 50, 49.7 | |
| Example 94 | Pd, $Co_3O_4$, TS | 0.3, 50, 49.7 | |
| Example 95 | Pd, NiO, TS | 0.3, 50, 49.7 | |
| Example 96 | Pd, CuO, TS | 0.3, 50, 49.7 | |
| Example 97 | Pd, ZnO, TS | 0.3, 50, 49.7 | |
| Example 98 | Pd, PbO, TS | 0.3, 50, 49.7 | |

TABLE 5

| Adsorbent | Composition of adsorvent | Weight ratio (%) | Specific surface ($m^2/g$) |
|---|---|---|---|
| Example 99 | Ru, $MnO_2$, $Al_2O_3$ | 0.3, 50, 49.7 | 85 |
| Example 100 | Ru, $MnO_2$, $TiO_2$ | 0.3, 50, 49.7 | 55 |
| Example 101 | Ru, $MnO_2$, $ZrO_2$ | 0.3, 50, 49.7 | 65 |
| Example 102 | Ru, $MnO_2$, TZ | 0.3, 50, 49.7 | 64 |
| Example 103 | Ru, $MnO_2$, AS | 0.3, 50, 49.7 | 160 |
| Example 104 | Ru, $MnO_2$, $Fe_2O_3$, TS | 0.3, 20, 20, 59.7 | 110 |
| Example 105 | Ru, $MnO_2$, $Co_3O_4$, TS | 0.3, 20, 20, 59.7 | 118 |
| Example 106 | Ru, $MnO_2$, NiO, TS | 0.3, 20, 20, 59.7 | 124 |
| Example 107 | Ru, $MnO_2$, CuO, TS | 0.3, 20, 20, 59.7 | 116 |
| Example 108 | Ru, $MnO_2$, ZnO, TS | 0.3, 20, 20, 59.7 | 107 |
| Example 109 | Ru, $MnO_2$, PbO, TS | 0.3, 20, 20, 59.7 | 110 |
| Example 110 | Ru, $Co_3O_4$, NiO, TS | 0.3, 20, 20, 59.7 | 123 |
| Example 111 | Ru, $Co_3O_4$, CuO, TS | 0.3, 20, 20, 59.7 | 116 |
| Example 112 | Ru, $Co_3O_4$, Zno, TS | 0.3, 20, 20, 59.7 | 108 |
| Example 113 | Ru, $Co_3O_4$, PbO, TS | 0.3, 20, 20, 59.7 | 110 |

TABLE 6

NO$_x$ removal ratio (%)

| | | Example 115 | | Example 116 | |
| --- | --- | --- | --- | --- | --- |
| Adsorbent | Example 114 1 hr | After 10 hrs | After 20 hrs | After 10 hrs | After 20 hrs |
| Example 29 | 33 | 45 | 34 | 53 | 50 |
| Example 30 | 22 | 33 | 23 | 39 | 35 |
| Example 31 | 25 | 36 | 26 | 43 | 40 |
| Example 32 | 25 | 35 | 26 | 42 | 39 |
| Example 33 | 24 | 34 | 25 | 41 | 38 |
| Example 34 | 11 | 16 | 11 | 20 | 18 |
| Example 35 | 11 | 17 | 12 | 21 | 19 |
| Example 36 | 25 | 36 | 26 | 43 | 40 |
| Example 37 | 16 | 23 | 17 | 28 | 26 |
| Example 38 | 19 | 27 | 20 | 33 | 31 |
| Example 39 | 17 | 26 | 18 | 31 | 28 |
| Example 40 | 18 | 27 | 19 | 32 | 29 |
| Example 41 | 18 | 27 | 19 | 32 | 29 |
| Example 42 | 17 | 26 | 18 | 31 | 28 |
| Example 43 | 60 | 76 | 62 | 83 | 80 |
| Example 44 | 45 | 60 | 47 | 68 | 65 |
| Example 45 | 49 | 65 | 50 | 73 | 69 |
| Example 46 | 47 | 63 | 49 | 71 | 67 |
| Example 47 | 49 | 64 | 50 | 72 | 69 |
| Example 48 | 43 | 57 | 45 | 65 | 63 |
| Example 49 | 41 | 55 | 42 | 63 | 60 |
| Example 50 | 42 | 55 | 43 | 63 | 61 |
| Example 51 | 29 | 41 | 30 | 48 | 45 |
| Example 52 | 33 | 45 | 35 | 53 | 51 |
| Example 53 | 30 | 43 | 32 | 51 | 47 |
| Example 54 | 32 | 44 | 33 | 52 | 49 |
| Example 55 | 29 | 40 | 30 | 47 | 45 |
| Example 56 | 30 | 41 | 31 | 48 | 46 |
| Example 57 | 33 | 45 | 34 | 53 | 50 |
| Example 58 | 21 | 32 | 22 | 38 | 34 |
| Example 59 | 25 | 36 | 26 | 43 | 40 |
| Example 60 | 24 | 34 | 25 | 41 | 38 |
| Example 61 | 25 | 35 | 26 | 42 | 39 |
| Example 62 | 24 | 35 | 19 | 40 | 37 |
| Example 63 | 25 | 34 | 18 | 41 | 36 |

TABLE 7

NO$_x$ removal ratio (%)

| | | Example 115 | | Example 116 | |
| --- | --- | --- | --- | --- | --- |
| Adsorbent | Example 114 1 hr | After 10 hrs | After 20 hrs | After 10 hrs | After 20 hrs |
| Example 64 | 37 | 51 | 39 | 59 | 56 |
| Example 65 | 26 | 37 | 27 | 44 | 41 |
| Example 66 | 30 | 42 | 31 | 49 | 46 |
| Example 67 | 29 | 41 | 30 | 48 | 45 |
| Example 68 | 28 | 40 | 29 | 47 | 44 |
| Example 69 | 14 | 21 | 15 | 26 | 24 |
| Example 70 | 15 | 22 | 16 | 27 | 25 |
| Example 71 | 30 | 42 | 31 | 49 | 46 |
| Example 72 | 20 | 28 | 21 | 34 | 32 |
| Example 73 | 23 | 33 | 24 | 39 | 37 |
| Example 74 | 21 | 31 | 22 | 37 | 34 |
| Example 75 | 22 | 32 | 23 | 38 | 35 |
| Example 76 | 23 | 33 | 24 | 39 | 34 |
| Example 77 | 24 | 34 | 25 | 40 | 33 |
| Example 78 | 67 | 83 | 69 | 89 | 86 |
| Example 79 | 51 | 66 | 52 | 74 | 71 |
| Example 80 | 55 | 71 | 56 | 79 | 75 |
| Example 81 | 53 | 69 | 54 | 77 | 73 |
| Example 82 | 55 | 70 | 56 | 78 | 75 |
| Example 83 | 49 | 63 | 50 | 71 | 69 |
| Example 84 | 46 | 61 | 48 | 69 | 66 |
| Example 85 | 47 | 61 | 49 | 69 | 67 |
| Example 86 | 33 | 46 | 35 | 54 | 51 |
| Example 87 | 38 | 51 | 40 | 59 | 57 |

TABLE 7-continued

NO$_x$ removal ratio (%)

| | | Example 115 | | Example 116 | |
| --- | --- | --- | --- | --- | --- |
| Adsorbent | Example 114 1 hr | After 10 hrs | After 20 hrs | After 10 hrs | After 20 hrs |
| Example 88 | 35 | 49 | 36 | 57 | 53 |
| Example 89 | 37 | 50 | 38 | 58 | 55 |
| Example 90 | 33 | 45 | 35 | 53 | 51 |
| Example 91 | 30 | 52 | 36 | 54 | 52 |
| Example 92 | 33 | 51 | 39 | 59 | 56 |
| Example 93 | 22 | 37 | 26 | 44 | 40 |
| Example 94 | 26 | 42 | 31 | 49 | 46 |
| Example 95 | 24 | 40 | 29 | 47 | 44 |
| Example 96 | 25 | 41 | 30 | 48 | 45 |
| Example 97 | 26 | 41 | 30 | 47 | 43 |
| Example 98 | 25 | 42 | 29 | 48 | 44 |

TABLE 8

NO$_x$ removal ratio (%)

| | | Example 27 | | Example 28 | |
| --- | --- | --- | --- | --- | --- |
| Adsorbent | Example 26 1 hr | After 10 hrs | After 20 hrs | After 10 hrs | After 20 hrs |
| Example 99 | 59 | 82 | 67 | 88 | 84 |
| Example 100 | 57 | 79 | 65 | 86 | 83 |
| Example 101 | 60 | 80 | 68 | 87 | 85 |
| Example 102 | 59 | 79 | 67 | 86 | 84 |
| Example 103 | 60 | 80 | 68 | 87 | 85 |
| Example 104 | 45 | 67 | 52 | 75 | 71 |
| Example 105 | 74 | 91 | 82 | 95 | 94 |
| Example 106 | 55 | 76 | 63 | 83 | 81 |
| Example 107 | 54 | 77 | 62 | 84 | 80 |
| Example 108 | 60 | 82 | 68 | 88 | 85 |
| Example 109 | 53 | 75 | 61 | 82 | 79 |
| Example 110 | 44 | 65 | 51 | 73 | 70 |
| Example 111 | 45 | 67 | 52 | 75 | 71 |
| Example 112 | 59 | 78 | 67 | 85 | 84 |
| Example 113 | 70 | 89 | 78 | 94 | 92 |
| Control 1 | 1 | 2 | 0 | 3 | 0 |

What is claimed is:

1. A method for the removal of nitrogen oxides from an exhaust gas containing same, which method comprises:
adding ozone into the exhaust gas, and bringing the resultant gas into contact with an adsorbent comprising:
(a) at least one material selected from the group of noble metals consisting of platinum, gold, ruthenium, rhodium, and palladium and a compound of one of said noble metals selected from the group consisting of oxides, hydroxides, ammonium salts, nitrates, sulfates, carbonates, acetates, oxalates and halides, and
(b) a carrier which comprises at least one member selected from the group consisting of zirconia, titania-silica complex oxide and titania-zirconia complex oxide, thereby causing the adsorbent to adsorb nitrogen oxides contained in the exhaust gas wherein the temperature of the exhaust gas contacting the adsorbent on the carrier is in the range of 0–100° C., wherein the molar ratio of the amount of ozone to nitrogen monoxide is in the range of 1.05 to 5 mol.

2. The method of claim 1 wherein (a) is 0.01 to 10% by weight of said carrier as metal.

3. The method of claim 2 wherein said carrier is titania-silica complex oxide.

4. The method of claim 3 wherein the noble metal or compound thereof is ruthenium or compound thereof.

5. A method according to claim 1, wherein the molar ratio of the amount of ozone to nitrogen monoxide is in the range of 1.5 to 5 mol.

6. A method for the removal of nitrogen oxides from an exhaust gas containing same, which method comprises:

adding ozone into the exhaust gas, and bringing the resultant gas into contact with an adsorbent comprising:
(a) at least one material selected from the group of noble metals consisting of platinum, gold, ruthenium, rhodium, and palladium and a compound of one of said noble metals selected from the group consisting of oxides, hydroxides, ammonium salts, nitrates, sulfates, carbonates, acetates, oxalates and halides and
(c) an oxide of at least one heavy metal selected from the group consisting of manganese, iron, cobalt, nickel, copper, zinc and lead, thereby causing the absorbent to adsorb the nitrogen oxides contained in the exhaust gas wherein the temperature of the exhaust gas contacting the adsorbent is in the range of 0–100° C. wherein the ozone in the molar ratio of the amount of ozone to nitrogen is in the range of 1.05 to 5 mol.

7. The method of claim 6 wherein (a) is 0.01% to 10% by weight of (a) and (c) as metal.

8. The method of claim 7 wherein the (a) is ruthenium or compound thereof.

9. A method according to claim 6, wherein the molar ratio of the amount of ozone to nitrogen monoxide is in the range of 1.5 to 5 mol.

10. A method for the removal of nitrogen oxides from an exhaust gas containing same, which methods comprises:

adding ozone into the exhaust gas, and bringing the resultant gas into contact with an absorbent comprising:
a) at least one material selected from the group of noble metals consisting of platinum, gold, ruthenium, rhodium, and palladium and a compound of one of said noble metals selected from the group consisting of oxides, hydroxides, ammonium salts, nitrates, sulfates, carbonates, acetates, oxalates and halides thereof, and
(c) an oxide of at lease one heavy metal selected from the group consisting of manganese, iron, cobalt, nickel, copper, zinc, and lead, and
(d) a carrier comprising at least one member selected from the group consisting of alumina, titania, silica, zirconia, alumina-silica complex oxide, titania-silica complex oxide and titania-zirconia complex oxide, thereby causing the adsorbent to adsorb nitrogen oxides contained in the exhaust gas wherein the temperature of the exhaust gas contacting the adsorbent on the carrier is in the range of 0–100° C., wherein the molar ratio of the amount of ozone to nitrogen monoxide is in the range of 1.05 to 5 mol.

11. The method of claim 10 wherein a) is 0.01 to 10% by weight of (a), (c) or (d).

12. The method of claim 10 wherein d) is titania-silica complex oxide.

13. The method according to claim 12, wherein the noble metal or compound thereof is ruthenium or a compound thereof.

14. A method according to claim 10, wherein the molar ratio of the amount of ozone to nitrogen monoxide is in the range of 1.5 to 5 mol.

* * * * *